Dec. 1, 1931.　　G. C. McINTIRE　　1,834,000
HEDGE SAW
Filed Aug. 8, 1929　　2 Sheets-Sheet 2

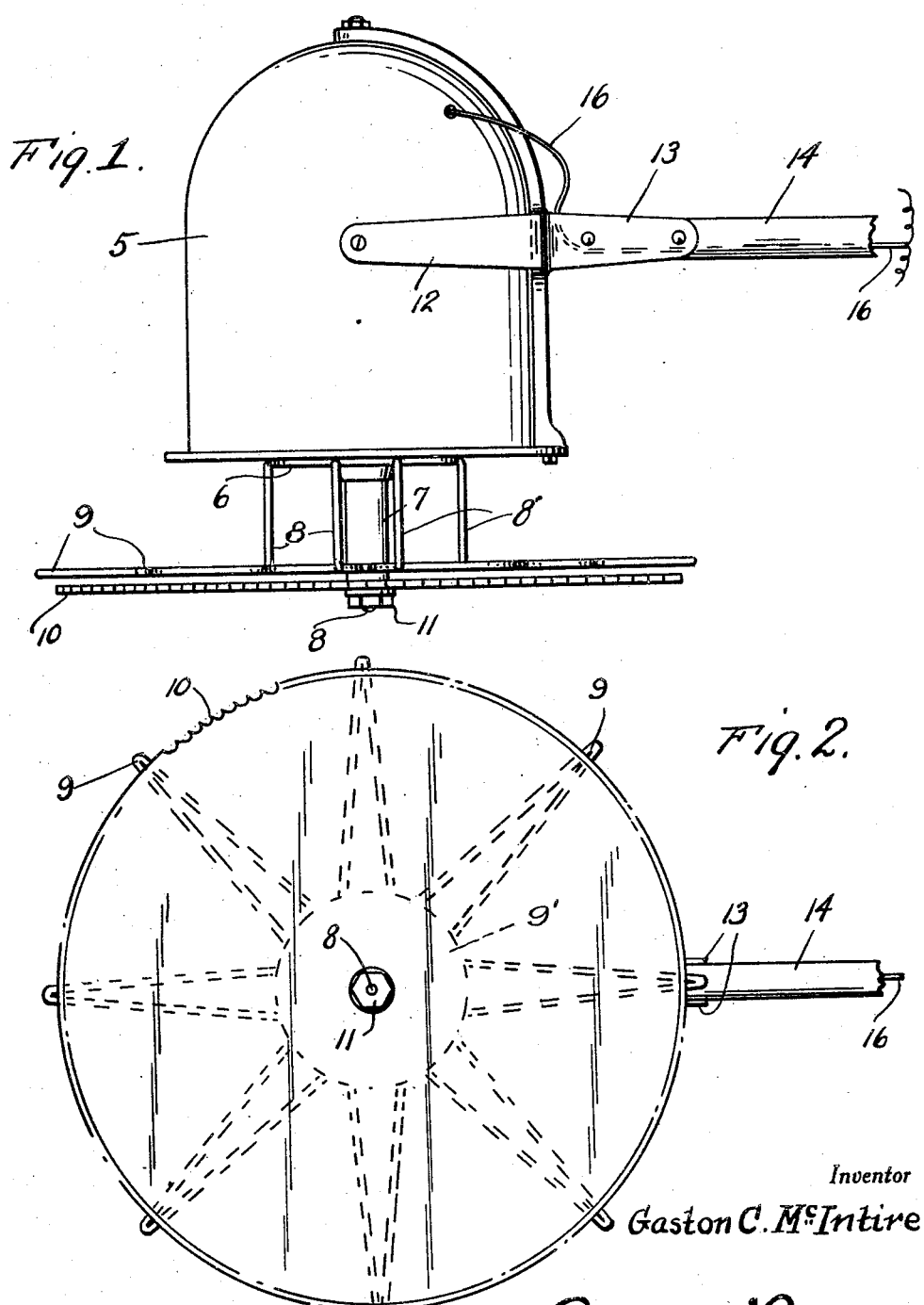

Inventor
Gaston C. McIntire
By Clarence A. O'Brien
Attorney

Patented Dec. 1, 1931

1,834,000

UNITED STATES PATENT OFFICE

GASTON C. McINTIRE, OF WILMINGTON, NORTH CAROLINA

HEDGE SAW

Application filed August 8, 1929. Serial No. 384,409.

This invention relates to saws and more particularly to saws adapted for trimming and clipping foliage, and can be used for trimming bushes, trees and the like, but is more particularly adapted for trimming hedges, and has as its primary object the provision of an apparatus in which a rapidly rotating cutter or saw strikes the foliage or hedge to be cut.

A still further object of the invention is to provide a saw of the character above mentioned, having a guide embodying a plurality of radially disposed spaced guard fingers so arranged with respect to the saw as to permit the hedge to slide between the guard fingers, the guard fingers acting as a protector to keep the tender stems of the hedge from blowing away out of contact with the saw.

A still further object of the invention is to provide a guard for the trimmer which will prevent contact of a person's leg, or other part of the person with the hedge saw.

A still further object of the invention resides in the provision of a trimmer of this nature, which will insure cutting the hedge, foliage or other bushing to be cut in a neat even manner so that the trimmed hedge will present a pleasant appearance, and at the same time to provide a trimmer which will be light, durable, simple in construction, easy of operation, clearly practical, reliable and efficient in use.

Other objects and advantages of the invention will become apparent during a study of the following description taken in connection with the accompanying drawings, wherein:—

Figure 1 is a side elevation of a hedge saw constructed in accordance with the present invention.

Figure 2 is a bottom plan view of the saw cutter.

Figure 3:
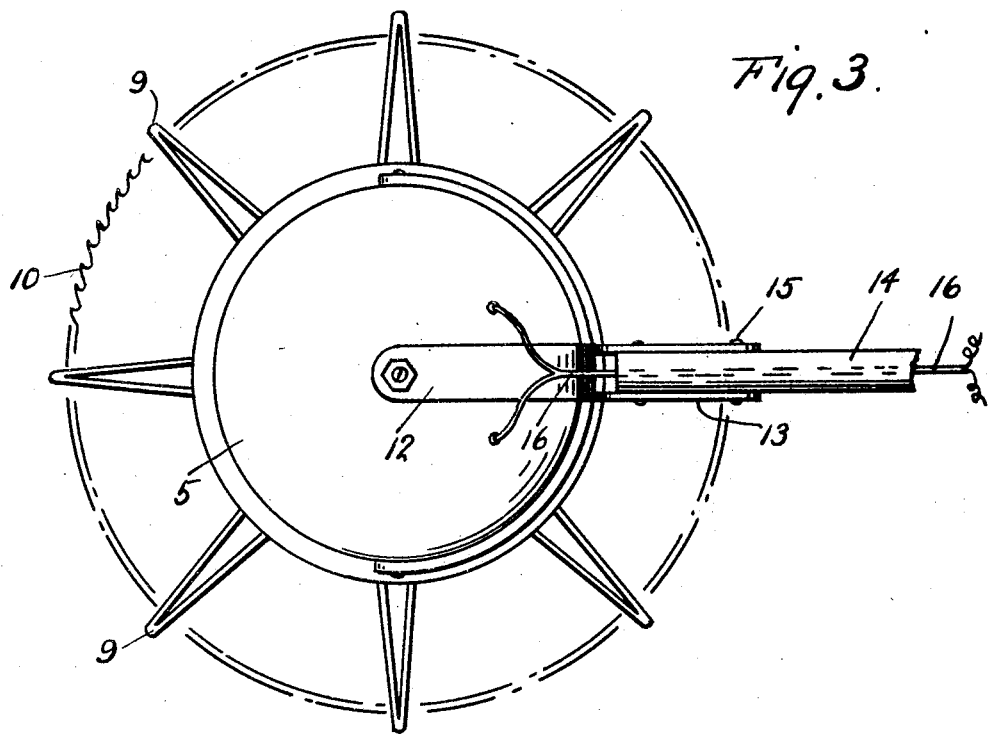
Figure 3 is a top plan view of the saw cutter.
Figure 4:
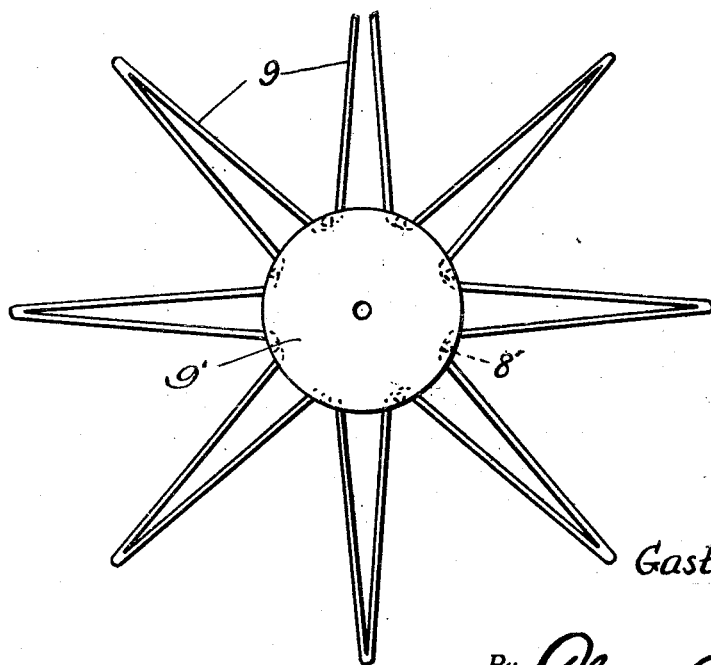
Figure 4 is a top plan view of the guard.

With reference more in detail to the drawings, it will be seen that my improved hedge saw comprises a motor designated generally by the reference character 5, and this motor is preferably an electric motor but may be any desired motor capable for use in this capacity. A finger or guard supporting plate 6 is suitably secured to the bottom of the motor casing 5 and this plate 6 is provided with a central bearing depending therefrom and designated by the reference character 7. Rotatable in the bearing 7 is the projected end of the motor shaft 8. Depending from the plate 6 and arranged in circumferentially spaced relation thereon are the supporting arms 8'. Radially disposed circumferentially spaced guard fingers 9 are secured at their inner ends to a circular body member or plate 9' which in turn is secured to the lower ends of the members 8' as clearly shown. Beneath the guard fingers 9 in spaced relation thereto is a cutting element designated generally by the reference character 10. This cutting element is in the nature of a circular saw and is secured to the outer end of the motor shaft 8 in any suitable manner such as designated as at 11 for rotation with the shaft of the motor.

It is to be noted that the guard fingers 9 at their outer ends project beyond the periphery of the saw 10, and also that these guard fingers are especially formed of wire and are of elongated V-shaped configuration with their apices or outer ends as before mentioned extending beyond the periphery of the saw blade 10.

Intermediately top and bottom of the motor casing, remote from the saw 10, the casing is provided with a suitable bracket 12, terminating in a reduced bifurcated extension to provide spaced parallel horizontal arms 13—13. The arms 13—13 are adapted to receive therebetween one end of a tubular handle 14. One end of the handle 14 is secured between and to the arms 13—13 by bolts or other suitable fastening elements 15.

The conductor 16 which is used for supplying current to the motor is preferably passed through the handle and into the motor casing on opposite sides of the bracket 12 adjacent the upper end of the casing as clearly shown. It is intended, that a suitable switch not shown be arranged on the handle at the outer end of the handle for regulating the supply of electric current to the motor that may be desired. Manifestly, the conductor 16 may be connected to the ordinary house current supply or to any suitable apparatus utilized to generate the current desired.

From the foregoing it will be seen that in using a hedge saw of this nature, and that when trimming the hedge, should one strike a piece of old hedge the saw will go right through it as quickly as it will the young and tender branches of the hedge, consequently making it much easier to line or trim the hedge and keep it trimmed, and further that the sawing action which obtains will permit of the cutting of the hedge as rapidly as the operator can move along with it and will result in as neat and attractively trimmed hedge as may be desired. It will also be appreciated that a device of this nature is economical, and may be readily and easily operated in the hands of the non-skilled.

Even though I have herein shown and described the preferred embodiment of my invention, it is to be understood that the same is susceptible of changes fully comprehended by the spirit of the same as herein described, and the scope of the appended claim.

Having described my invention, what I claim as new is:—

A device for trimming hedges, bushes and the like including a motor, a guard carried by said motor and spaced from one end of the same, and a circular saw mounted upon the shaft of said motor and arranged at the opposite side of the guard with respect to the motor, said guard comprising a circular series of radially disposed, loop-shaped fingers alongside said saw, and having their outer ends disposed beyond the periphery of the saw, and arms in parallelism to the motor shaft, grouped about said shaft and interposed between and connecting the motor and the inner portions of the guard fingers.

In testimony whereof I affix my signature.

GASTON C. McINTIRE.